(12) United States Patent
Aridome et al.

(10) Patent No.: US 7,233,736 B2
(45) Date of Patent: Jun. 19, 2007

(54) RECORDING METHOD AND APPARATUS, AND RECORDING MEDIUM

(75) Inventors: Kenichiro Aridome, Kanagawa (JP);
Katsumi Matsuno, Kanagawa (JP);
Shingo Yoshioka, Kanagawa (JP);
Akinobu Sugino, Kanagawa (JP)

(73) Assignees: Sony Corporation, Tokyo (JP);
Pioneer Corporation, Tokyo (JP)

( * ) Notice: Subject to any disclaimer, the term of this patent is extended or adjusted under 35 U.S.C. 154(b) by 929 days.

(21) Appl. No.: 10/431,877

(22) Filed: May 7, 2003

(65) Prior Publication Data

US 2003/0210895 A1 Nov. 13, 2003

(30) Foreign Application Priority Data

May 9, 2002 (JP) ............ P2002-134747

(51) Int. Cl.
*H04N 5/91* (2006.01)
(52) U.S. Cl. ....................... 386/131; 386/95
(58) Field of Classification Search .......... 386/70, 386/46, 52, 9, 5, 124–126, 131; 369/32, 369/58; 360/48, 60
See application file for complete search history.

(56) References Cited

U.S. PATENT DOCUMENTS 6,118,924 A * 9/2000 Nakatani et al. ............ 386/70

2002/0021890 A1 * 2/2002 Haino et al. ................ 386/95

FOREIGN PATENT DOCUMENTS

| JP | 2000 13728 | 1/2000 |
|----|-----------|--------|
| JP | 2000 57746 | 2/2000 |
| JP | 2002 50131 | 2/2002 |
| JP | 2002 63765 | 2/2002 |

* cited by examiner

*Primary Examiner*—Thai Q. Tran
*Assistant Examiner*—Mishawn Dunn
(74) *Attorney, Agent, or Firm*—Frommer Lawrence & Haug LLP; William S. Frommer

(57) ABSTRACT

In a ROW-based DVD-RW, a DVD video file is managed according to provisional VMGI (TMP_VMGI) and an extension file other than the DVD video file, such as a JPEG file or the like is managed according to intermediate management information (TMP_EXTI), and temporary space bitmap (TMP_SBM) used in UDF and the like is added to provisional VMGI (TMP_VMGI to record a combination of the DVD video file and extension file such as JPEG file and manage the temporary space. Thereby, the temporary space can be known from TMP_SBM, and even when the extension file has been deleted, the DVD-RW is made interchangeable with a read-only optical disk through finalization. Thus, the present invention allows to record a file of still pictures other than moving pictures and also pad information in a temporary space resulted from deletion of any recorded area.

5 Claims, 13 Drawing Sheets

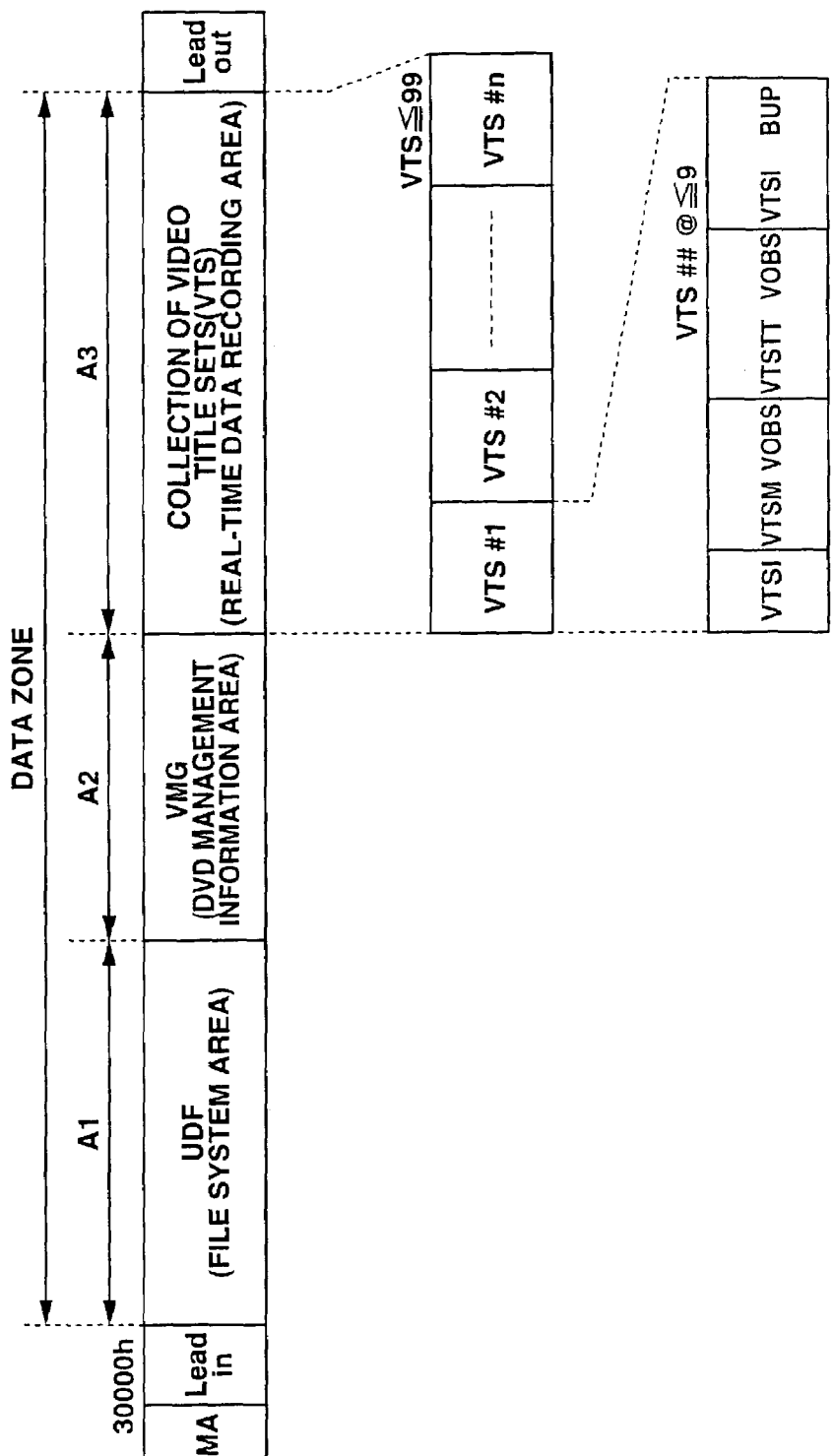

FIG.2(A)

| Rzone 1 | Rzone 2 | Invisible Rzone |

FIG.2(B)

| Rzone 1 | Rzone 2 | VTSTT VOBS | VTSI BUP |

FIG.2(C)

| Rzone 1 | VTSI | VTSM VOBS | VTSTT VOBS | VTSI BUP |

FIG.2(D)

| Rzone 1 | VTS #1 | Rzone 3 | Invisible Rzone |

FIG.2(E)

| Rzone 1 | VTS #1 | Rzone 3 | VTSTT VOBS | VTSI BUP |

FIG.2(F)

| Rzone 1 | VTS #1 | VTSI | VTSM VOBS | VTSTT VOBS | VTSI BUP |

FIG.2(G)

| Rzone 1 | VTS #1 | VTS #2 |

FIG.2(H)

| Lead in | UDF | VMG | VTS #1 | VTS #2 | ------ | VTS #n | Lead out |

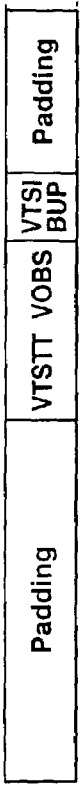
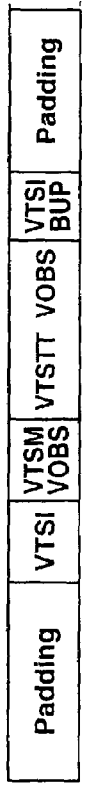
FIG.3(A)
FIG.3(B)
FIG.3(C)
FIG.3(D)
FIG.3(E)
FIG.3(F)
FIG.3(G)

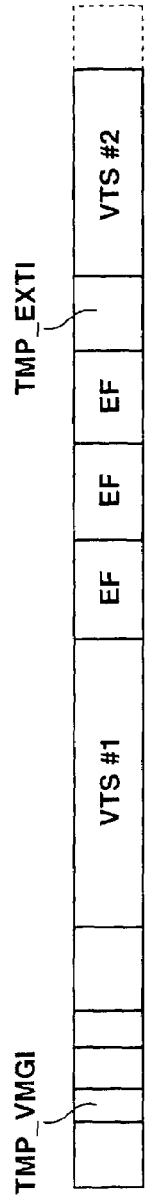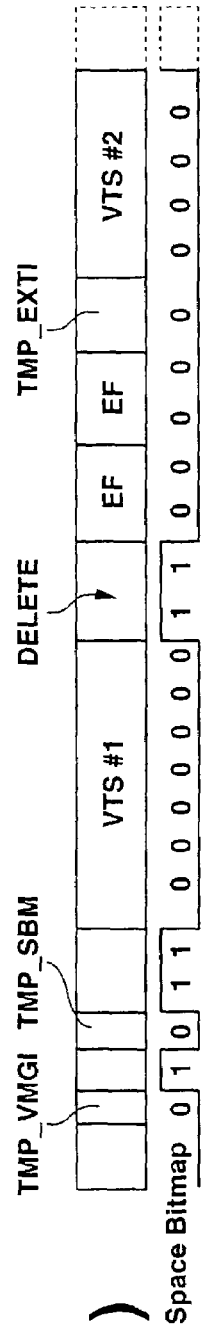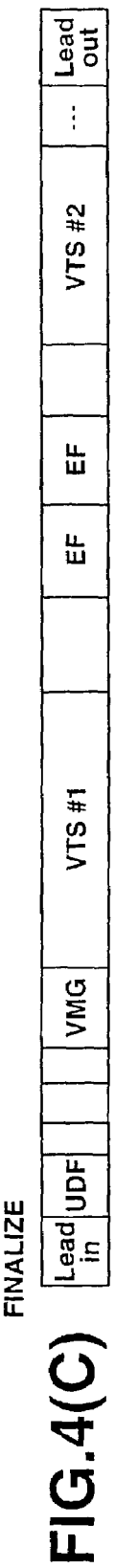

RBP1

| b7 | b6 | b5 | b4 | b3 | b2 | b1 | b0 |
|---|---|---|---|---|---|---|---|
| ECC0 | ECC1 | ECC2 | ECC3 | ECC4 | ECC5 | ECC6 | ECC7 |

RBP2

| b7 | b6 | b5 | b4 | b3 | b2 | b1 | b0 |
|---|---|---|---|---|---|---|---|
| ECC8 | ECC9 | ECC10 | ECC11 | ECC12 | ECC13 | ECC14 | ECC15 |

RECORDING METHOD AND APPARATUS, AND RECORDING MEDIUM

BACKGROUND OF THE INVENTION

1. Field of the Invention

The present invention relates to a recording method, a recording apparatus and a recording medium, capable of recording information to a rewritable optical disk such as DVD-RW (DVD-rewritable).

This application claims the priority of the Japanese Patent Application No. 2002-134747 filed on May 9, 2002, the entirety of which is incorporated by reference herein.

2. Description of the Related Art

Conventionally, there are available DVDs as large-capacity optical disks including writable DVDs (digital versatile disk) such as a DVD-R (DVD-recordable), DVD-RW (DVD-rewritable) and DVD-RAM (DVD-random access memory). Of these DVDs, DVD-R and DVD-RW having video data recorded therein in a format complying with the DVD video format can be played by a reproduce-only optical disk player. Further, an optical disk having data recorded in the universal disk format (UDF) can be reproduced by a computer to reproduce the data.

FIG. 1 shows a chart explaining the DVD video format-based logical format of an optical disk. As shown in FIG. 1(A), the optical disk having this logical format has the information recording area thereof divided into a zone called "lead-in" at the innermost circumference thereof, a data zone and a zone called "lead-out" at the outermost circumference. The optical disk will have desired video data or the like recorded to the data zone thereof.

As shown, the data zone consists of a UDF (universal disk format) area (file system area) A1 in which a UDF bridge configuration is stated, VMG (video manager) area (DVD management information area) A2 and a real-time data recording area A3 in this order from the lead-in zone. The UDF and VMG areas are provided to record management information used to manage files of video data recorded in this optical disk. Of these UDF and VMG areas, the VMG area A2 being a second management information recording area is directed to a file management system unique to the DVD video format and will have recorded thereto TOC information (table of contents) used for management of all video data recorded in the real-time data recording area A3. On the other hand, the UDF area A1 being a first management information recording area is directed to a file management by a computer, and will have recorded thereto management information used for management of all the video data recorded in the real-time data recording area A3 in a format compatible with the file management system of the computer.

As shown in FIG. 1(B), the real-time data recording area A3 is a program area where real data are to be recorded, and will have video data recorded therein in units of VTS (video title set; will be referred to simply as "title" wherever appropriate hereunder). It should be noted that a maximum of 99 VTSs can be provided. It is also important to note that as shown in FIG. 1(C), the "VTS" is composed of VTSI (video title set information), VTSM VOBS (video object set for the VTSM), VTSTT VOBS (video object set for titles in a VTS), and VTSI BUP (backup of VTSI) in this order. VTSTT VOBS will have recorded thereto MPEG (Moving Pictures Experts Group)-2-formatted video data as real video data, VTSI will have recorded thereto the address information etc. for management of the video data composed of real data, and VTSTT VOBS will have a title menu of the video data recorded thereto. It should be noted that VTSTT VOBS is an option and VTSI BUP is a backup of VTSI.

When the above optical disk is accessed by a computer, a desired file can be searched based on UDF for reproduction. When the optical disk is reproduced by a DVD player, a desired file can be searched based on VMG for reproduction.

Video data is written to such an optical disk by either an incremental recording method (will be referred to as "INC method" hereunder) or restricted overwrite method (will be referred to as "ROW method" hereunder). The INC method is intended for sequential recording of video data, while the ROW method is applied to an overwritable optical disk. In the ROW method as well, however, video data which are to be recorded to a fresh (unrecorded) area will sequentially be recorded. In these INC and ROW methods, an RMA (recording management area) formed along the inner circumference of the lead-in zone provides an area management such as a recording programming of the optical disk.

FIG. 2 is a chart for explaining the INC-based recording procedure. For the INC-based recording, it is defined that data should be recorded to up to three areas each called "Rzone". Each Rzone is managed under the RAM standard.

More specifically, in the INC-based recording of moving pictures, Rzones are first reserved as shown in FIG. 2(A). For this reservation of Rzones, a Rzone 1 for UDF and VMG areas in which management information is to be recorded is defined, a next Rzone 2 for VTSI and VTSM VOBS of a top VTS is defined in an unrecorded area forming a real-time data recording area, and a remaining unrecorded area is defined as "invisible Rzone". In the INC method, the management information recording area and also the areas in which VTSI and VTSM VOBS of the top VTS are formed are reserved by reserving the Rzone1 and Rzone2.

In the INC method, VTSTT VOBS of real data is defined by recording video data sequentially starting at the beginning of "Invisible Rzone". Further, upon completion of recording of the real data under one title with a user's instruction, VTSI BUP is recorded next to the recording of the real data as shown in FIG. 2(B) and VTSI and VTSM VOBS are defied in the Rzone 2 again at the beginning and the Rzone 2 is closed as shown in FIG. 2(C). Thus, one VTS is recorded to the optical disk by the INC method.

In the INC method, for continuously recording a next title, Rzone 3 is reserved in a remaining unrecorded area and areas are reserved for VTSI and VTSM VOBS to define the "Invisible Rzone" as shown in FIG. 2(D). Further, after defining VTSTT VOBS by recording real data, VTSI BUP is defined as shown in FIG. 2(E), and VTSI and VTSM VOBS are reserved in the previously reserved areas as shown in FIG. 2(F). Thus, a next VTS is recorded as shown in FIG. 12(G). In the INC method, when a title is recorded next, unrecorded areas are defined similarly to sequentially record VTSs to the areas.

On the other hand, in an optical disk having VTSs sequentially recorded therein to define a real-time data recording area, there are defined areas for UDF and VMG by finalization by the INC method to define lead-in and lead-out zones as shown in FIG. 2(H). Thus, the optical disk is interchangeable with a read-only optical disk. It should be noted that in defining the UDF and VMG areas, UDF and VMG data are generated based on the data in the areas for the tiles VTSI and VTSM VOBS, and the data are recorded to the Rzone 1 which will thus be closed.

FIG. 3 shows a chart for explaining the ROW-based recording procedure. In the ROW method, a lead-in, UDF and VMG areas, and areas for recording the leading titles VTSI and VTSM VOBS are pre-reserved by padding as shown in FIG. 3(A). It should be noted that the "padding" refers to a process for reserving an area by recording there dummy data such as null (zero) or the like.

In the ROW method, when these areas are reserved, video data are sequentially recorded to define a VTSTT VOBS composed of real data as shown in FIG. 3(B). Upon completion of recording the real data under one title, a VTSI BUP area is defined, and padding is done for reserving recording areas for subsequent titles VTSI and VTSM VOBS, as shown in FIG. 3(B). Then, reservation of VTSI and VTSM VOBS areas for recording the real data will be repeated again from the beginning as shown in FIG. 3(C). Thus, one VTS is recorded in the optical disk by the ROW method.

In the ROW method, for continuously recording a next title, real data are recorded following a padded area composed of a preceding VTS to define VTSTT VOBS and VTSI BUP areas, and then padding is done for reserving subsequent titles VTSI and VTSM VOBS, as will be known from FIG. 3(D). Subsequently, areas are defined for titles VTSI and VTSM VOBS as shown in FIG. 3(E) to thereby record successive VTSs to the optical disk as shown in FIG. 3(F). In the ROW method, for successively recording titles, similar padding is done to record VTSs sequentially.

On the other hand, in an optical disk having such VTSs sequentially recorded therein to define a real-time data recording area, the ROW method defines UDF and VMG areas by finalization as in the INC method, and then lead-in and lead-out as shown in FIG. 3(G) to thereby establish interchangeability with a read-only optical disk. It should be noted that the UDF and VMG areas are defined by producing UDF and VMG data from the VTSI and VTSM VOBS title data and recording the data to an inner-circumferential leading area by padding.

Note that generally speaking, when recording data in the DVD video format to a DVD-RW medium, a file system is required which manages the intermediate state. In case data is recorded only in the DVD video format, information with which VTSs are managed is held in the intermediate-state management file system as well. Thus, when a VTS is deleted, it is detected which one of LSNs (logical sector number) in the medium becomes correspondingly blank, which information is used to record a new VTS to such a temporary space.

The Japanese laid-open patent No. 2002-063765 discloses a technique for making real-time recording of information to a DVD-R in such a manner that the information can also be reproduced by a read-only DVD player having information recorded therein regardless of any real time. With this disclosed video technique, when information is recorded to the DVD-R in compliance with the DVD video standard defined including at least VTS including VOBS to be produced and its corresponding VTSI and VMGI intended for control of one VTS or more, the VTS is recorded to the DVD-R, then provisional VMGI is generated which is provisional control information corresponding to the recorded VTS and used to define VMGI later for recording to the DVD-R, and the provisional VMGI thus generated is recorded to the DVD-R each time a VTS is recorded to the DVD-R. As above, when information to be recorded in units is recorded, the provisional control information is generated and recorded temporarily in a rewritable recording medium. Thereby, even when a plurality of pieces of information to be recorded in units has been recorded in the rewritable recording medium, by accurately recording real management control information later with the use of provisional control information including latest contents, it is possible to make real-time recording of information to the rewritable recording medium in compliance with a read-only recording medium-oriented recording format not based on any real-time information recording.

However, it is desired to record also extension files such as JPEG files other than DVD video files to a DVD-RW medium.

For example, it is conceivable that such an optical disk is played in place of the magnetic tape in a portable video camcorder. In this case, since some conventional video camcorders can record moving pictures as well as still pictures, such an optical disk for use with the portable video camcorder should also desirably be capable of recording still pictures other than moving pictures.

Even when such an extension file is held in the intermediate file system, management information is necessary to know the space availability.

Also, in case no extension file is supported, it cannot be known at which LSN recording should be started.

OBJECT AND SUMMARY OF THE INVENTION

It is therefore an object of the present invention to overcome the above-mentioned drawbacks of the related art by providing a recording method, a recording apparatus, and a recording medium, capable of recording also a file of still pictures other than moving pictures and padding information in a temporary space resulted from deletion of any recorded area.

The above object can be attained by providing a recording method of recording a combination of a file to be recorded and management information for the file to a user area on a recording medium, the method including, according to the present invention, the steps of changing the format of recording the combination of the file and management information to the user area on the recording medium according to the attribute of the file, managing a main file according to provisional management information, managing an extension file other than the main file according to intermediate management information, and managing, according to the intermediate management information, a temporary space to which the main and extension files are to be recorded, thereby recording the main and extension files together to the recording medium.

Also the above object can be attained by providing a recording apparatus including, according to the present invention, a management information generating means for generating management information for a file to be recorded, a recording means for recording the file and management information for the file in combination to a user area on the recording medium, and a control means for controlling the operations of at least the management information generating means and recording means, the control means changing the format of recording the combination of the file and management information to the user area on the recording medium according to the attribute of the file, managing a main file according to provisional management information, managing an extension file other than the main file according to intermediate management information, and managing, according to the intermediate management information, a temporary space to which the main and extension files are to be recorded, thereby recording the main file and extension files together to the recording medium.

Also the above object can be attained by providing a recording medium having recorded therein a control program readably by a control computer provided in a recording apparatus which records a combination of a file to be recorded and management information for the file to a user area on a recording medium, the program causing the control computer to function as a control means to change the format of recording the combination of the file and management information to the user area on the recording medium according to the attribute of the file, manage a main file according to provisional management information, manage an extension file other than the main file according to intermediate management information, and manage, according to the intermediate management information, a temporary space to which the main and extension files are to be recorded, thereby recording the main and extension files together to the recording medium.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIGS. 1(A) to (C) explain the DVD video format;
FIGS. 2(A) to (H) explain the INC-based recording;
FIGS. 3(A) to (G) explain the ROW-based recording;
FIGS. 4(A) to (C) schematically illustrate basic processing method of recording data in the DVD video format to a DVD disk according to the present invention.

DETAILED DESCRIPTION OF THE PREFERRED EMBODIMENTS

The embodiments of the present invention will be described in detail below with reference to the accompanying drawings:

According to the present invention, in a ROW-based DVD-RW, a DVD video file is managed according to provisional VMGI (TMP_VMGI) and an extension file other than the DVD video file, such as a JPEG file or the like is managed according to intermediate management information (TMP_EXTI) as shown in FIG. 4(A), and temporary space bitmap (TMP_SBM) used in UDF and the like is added to provisional VMGI (TMP_VMGI) as shown in FIG. 4(B) to record a combination of the DVD video file and extension file such as JPEG file and manage the temporary space. Thereby, the temporary space can be known from TMP_SBM, and even when the extension file has been deleted, the DVD-RW is made interchangeable with a read-only optical disk through finalization, as shown in FIG. 4(C).

Figure 5:
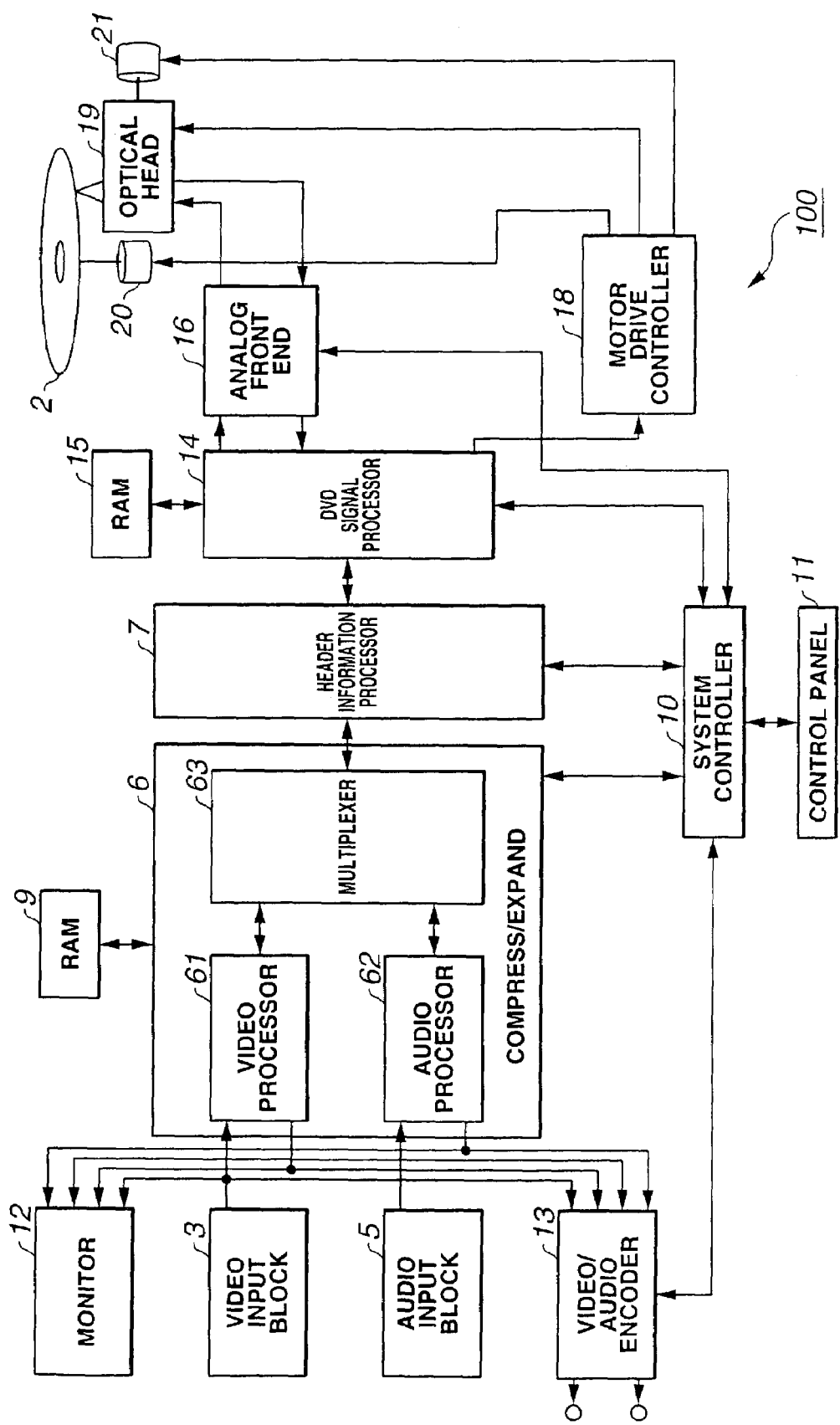
FIG. 5 is a block diagram of an embodiment of the optical disk recorder/player according to the present invention.

The present invention is applied to an optical disk recorder/player constructed as shown in FIG. 5 for example. The optical disk recorder/player is generally indicated with a reference 100.

The optical disk recorder/player 100 is a portable video camcorder adapted to record a result of imaging to an optical disk 2 such as a DVD-RW (DVD-rewritable) by the ROW method.

As shown in FIG. 5, the optical disk recorder/player 100 includes a video input block 3, audio input block 5, compress/expand block 6, head information processor 7, random access memories (RAM) 9 and 15, system controller 10, control unit 11, monitor block 12, video/audio encoder 13, DVD signal processor 14, analog front end block 16, motor drive controller 18, optical head 19, spindle motor 20, sled motor 21, etc. The compress/expand block 6 includes a video processor 61, audio processor 62 and a multiplexer 63.

In this optical disk recorder/player 100, the video input block 3 makes analog-digital conversion of video signals captured by picture pickup means (not shown) or video signals supplied from an external apparatus to provide video data and supplies the data to the compress/expand block 6, monitor block 12 and video/audio encoder 13. It should be noted that the incorporated pickup means is controlled by the system controller 10 to provide results of imaging composed of moving pictures or still pictures. Thus, the video input block 3 operates in response to the control by the system controller 10 of the pickup means to selectively receive either video data composed of moving picture or still picture data.

The audio input block 5 makes analog-digital conversion of audio signals picked up by a microphone or audio signals supplied from outside to produce and supply audio data to the compress/expand block 6, monitor block 12 and video/audio encoder 13.

The compress/expand block 6 is changed in mode of operation between recording and reproducing under the control of the system controller 10. More specifically, for recording, the compress/expand block 6 will use the random access memory (RAM) 9 to multiplex the video and audio data by compression and supply the data to a head information processor 7. On the contrary, for reproduction, the compress/expand block 6 will also use the RAM 9 to break the data supplied from the header information processor 7 into video and audio data, then expand the video and audio data, respectively, and supply the expanded data to the monitor block 12 and video/audio encoder 13.

More particularly, in the compress/expand block 6, the video processor 61 is controlled by the system controller 10 to compress video data supplied from the video input block 3, and outputs the compressed data. At this time, in case the video data is moving picture data, the compress/expand block 6 will take the MPEG-2 format for compression of the video data, and in case the video data is composed of still pictures, the compress/expand block 6 will compress the data in the JPEG (Joint Photographic Coding Experts Group) format and output the compressed data. Also, for data reproduction, the video processor 61 will expand video data output from the multiplexer 63 correspondingly to the format, MPEG-2 or JPEG, in which the data has been compressed, and outputs the expanded data. Also, for data recording, the audio processor 62 will compress audio data input from the audio input block 5 in the MPEG format, Dolby audio format or a linear PCM format, and output the compressed data. On the contrary, for data reproduction, the audio processor 62 will expand audio data supplied from the multiplexer 63 and output the expanded data. Further, for data recording, the multiplexer 63 makes time-division multiplexing of video data output from the video processor 61 and audio data output from the audio processor 62, and outputs the multiplexed data to the header information processor 7. On the contrary, for data reproduction, the multiplexer 63 will break the time-division multiplexed data output from the head information processor 7 into video and audio data, and supply these data to the video processor 61 and audio processor 62, respectively.

The optical disk driver 1 also includes a monitor block 12 composed of a display mechanism to monitor video data supplied from the video input block 3, audio data supplied from the audio input block 5 or video data and audio data supplied from the compress/expand block 6, and an audio processing mechanism. Thus, the optical disk recorder/player 100 according to the present invention can monitor captured pictures and sounds and results of data reproduction.

The video/audio encoder 13 compresses video and audio data supplied from the audio input block 5 or video and audio data supplied from the compress/expand block 6 in predetermined formats, respectively, and outputs the data to the external apparatus. Thus, the optical disk recorder/player 100 according to the present invention enables to monitor captured pictures and sounds and results of data reproduction on the external apparatus.

For data recording, the header information processor 7 is supplied with time-division multiplexed data supplied from the compress/expand block 6, and adds, to the time-division multiplexed data, header information unique to a DVD, header information on an extension file or the like under the control of the system controller 10, and outputs the data. Also, according to information supplied from the system controller 10, the header information processor 7 will produce data such as UDF, VMG, VTSI, etc. and output these data to the DVD signal processor 14. Also, for data reproduction, the header information processor 7 will separate, from output data from the DVD signal processor 14, head information having been added at the time of recording and output it to the compress/expand block 6. Also, the header information processor 7 informs the system controller 10 of the separated header information. It should be noted here that the above "extension file" is a file not defined in the DVD video format standardized for the optical disk 2 and in this embodiment, a still picture format is applied as the extension file.

For data recording, the DVD signal processor 14 will use the random access memory 15 to generate an error correction code from data output from the header information processor 7 and add the error correction code to the output data. Also, the DVD signal processor 14 makes scrambling, 8/15 modulation and the like and outputs a data string composed of the processing results as a serial data string to the analog front end block 16. On the contrary, for data reproduction, the DVD signal processor 14 will make decoding, descrambling and error correction of the output data from the analog front end block 16, namely, process the output data in an reverse order to the order in the data recording procedure, and output the results of such processes to the header information processor 7. Also, the DVD signal processor 14 make digital-analog conversion of drive information such as spindle control, tracking control, focus control and sled control data supplied from the system controller 10 to provide such drive signals and output the drive signals to a motor drive controller 18.

The analog front end block 16 generates a light amount control signal for a laser bean to be emitted from an optical head 19 to the optical disk 2, and outputs the control signal. For data reproduction, the analog front end block 16 will keep, according to the light amount control signal, the amount of laser beam projected onto the optical disk 2 from the optical head 19 at a constant value for data reading. On the contrary, for data recording, the analog front end block 16 will change the level of the light amount control signal correspondingly to the output data from the DVD signal processor 14, to thereby elevate the amount of laser beam intermittently from the value for data reproduction to a value for data recording correspondingly to the output data from the DVD signal processor 14.

Also, the analog front end block 16 amplifies and processes a result of detection of a return light supplied from the optical head 19 to generate a reproduced signal whose level varies correspondingly to a train of pits formed on the optical disk 2, and processes the reproduced signal for binary differentiation to yield reproduced data which will be supplied to the DVD signal processor 14. With the above processing of the result of return light detection, the analog front end block 16 will generate a tracking error signal and focus error signal of which the levels vary correspondingly to magnitudes of tracking error and focus error, respectively, and output these signals in the form of digital signal to the system controller 10.

The motor drive controller 18 is supplied with the drive signals from the DVD signal processor 14, and drives mechanisms corresponding to the drive signals. More specifically, the motor drive controller 18 drives to rotate a spindle motor 20 and sled moor 21 with ones, for spindle control and sled control, of these drive signals. Also, the motor amplifier 18 will drive an actuator installed in the optical head 19 with the drive signals for tracking control and focus control, respectively.

The spindle motor 20 chucks the optical disk 2 and drives to rotate the latter at a predetermined velocity. The sled motor 21 makes the optical head 19 movable radially of the optical disk 2.

Supplied with the light amount control signal from the analog front end block 16, the optical head 19 will emit a laser beam from a semiconductor laser incorporated therein, and focus the laser beam on the information recording area of the optical disk 2 through an objective lens. Also, a return light, namely, a reflected part of the laser beam projected on the optical disk 2 is guided to a predetermined photodetector element of the optical head 19 through the objective lens, and the result of light detection is supplied to the analog front end block 16. The objective lens of the optical head 19 is movable by the actuator driven with the tracking and focus control drive signals to have the tracking and focus thereof controlled. Also, the amount of laser beam is intermittently elevated according to the light amount control signal, whereby the information recording area of the optical disk 2 is locally elevated in temperature to record desired data there.

The system controller 10 is a computer which controls the operation of the entire optical recorder/player 100. By executing a processing program pre-installed in the optical disk recorder/player 100, supplied with signals of operations made by the user at the control panel 11 (not shown) and supplied with various signals detected by the analog front end block 16, the system controller 10 controls the operation of each of the component blocks. More specifically, the system controller 10 will be supplied with a tracking error signal and focus error signal detected by the analog front end block 16 to generate tracking and focus control drive information, convert these signals by the DVD signal processor 14 into analog signals and supply the analog signals to the motor drive controller 18 which in turn will control the tracking and focus of the optical head 19. Also, supplied with the header information detected by the header information processor 7, the system controller 10 will detect a laser beam-projected position, generates sled control drive information from the result of detection and supply the information to the DVD information processor 14, to thereby perform a seek and the like. Similarly, the system controller 10 will make a performance for spindle control.

The basic operations of the system controller 10, directed to the optical disk 2, have been described in the foregoing. Here will be described with reference to the flow chart in FIG. 6 operations that will be made by the system controller 10 for data read or write after the optical disk recorder/player 100 is turned on. In step SP1, the optical disk recorder/player 100 is turned on. Then the system controller 10 goes from step SP1 to SP2 where it will judge based on the result of detection of the optical disk 2 from a detection mechanism (not shown) whether the optical disk 2 is set in place in the optical disk recorder/player 100. If the result of judgment in step SP2 is negative (no optical disk 2 is set in place), the system controller 10 will repeat the operation in step SP2. On the contrary, when the optical disk recorder/player 100 has been turned on with the optical disk 2 loaded therein or when the optical disk 2 has been loaded after the optical disk recorder/player 100 is turned on, namely, when the above result of judgment is affirmative (the optical disk 2 is set in place), the system controller 10 will go from step SP2 to SP3. It should be noted that if the optical disk recorder/player 100 is turned off when the system controller 10 is repeating the operation in step SP2, the system controller 10 will go directly to step SP4 where it will exit this reproducing or recording procedure (power off).

In step SP3, the system controller 10 drives the sled motor 21 to move the optical head 19 to the innermost circumference of the optical disk 2, and is supplied with the result of reading the innermost-circumferential area from the DVD signal processor 14. In case the optical disk 2 is a finalized one, the system controller 10 will acquire data in the VMG area from the DVD signal processor 14. On the contrary, if the optical disk 2 is not any finalized one, the system controller 10 will acquire information in the RMA area from the DVD information processor 14. When the system controller 10 determines based on the information in the RMA area that data has already been recorded in the real-time data recording area of the optical disk 2, it searches the optical disk 2 for VTSI and VTSTT VOBS data in each VTS. Thus, as in an optical disk drive to record and reproduce an ordinary DVD, the system controller 10 will acquire management information required for data write to, and read from, the optical disk 2.

In this procedure, the system controller 10 acquires the data in the VMG area and data in the UDF area as well. When reading the real-time data recording area, the system controller 10 will also acquire intermediate management information, if any, found recorded in the real-time data recording area. Thus, the system controller 10 acquire also management information for an extension file not defined in the DVD video format to enable reading of the extension file from the optical disk 2. The system controller 10 will record and hold a series of thus acquired management information in a built-in memory.

Next, the system controller 10 goes to step SP5 where it will judge whether it is instructed to eject the optical disk 2. When the result of judgment is affirmative, the system controller 10 will instruct a loading mechanism (not shown) to eject the optical disk 2 and then go back to step SP2.

On the contrary, when supplied with an instruction for other than the ejection of the optical disk 2 from the user, the system controller 10 goes from step SP5 to SP6 where it will judge which the supplied user's instruction is, recording (REC), reproduction (PB) or power off. When the user's instruction is "PB (reproduction)", the system controller 10 goes from step SP6 to SP7 where it will proceed to reproduction of a file from the optical disk 2 and then return to step SP5.

When the user's instruction is "REC (recording)", the system controller 10 goes from step SP6 to SP8 where it will proceed to recording of moving or still pictures to the optical disk 2 and then go back to step SP5. It is important to note that when the optical disk 2 has UDF and VMG areas defined therein through the so-called finalization, the system controller 10 will skip over the recording procedure to step SP5 since the optical disk 2 has been processed against data recording. Also, even in case the optical disk 2 is a DVD-RW which is finalized but erasable, the system controller 10 will erase the data existent in the optical disk 2 with acknowledgment from the user and proceed to data recording.

When the user's instruction is "Power off", the system controller 10 goes from step SP6 to SP9 where it will proceed to turn off the power to the optical disk recorder/player 100 and then return to step SP4 where it will exit this recording or reproducing procedure.

In the recording one of the above procedures, when the optical disk 2 is DVD-RW, the system controller 10 will adopt the ROW method to record a moving or still picture file to the optical disk 2.

Figure 7:
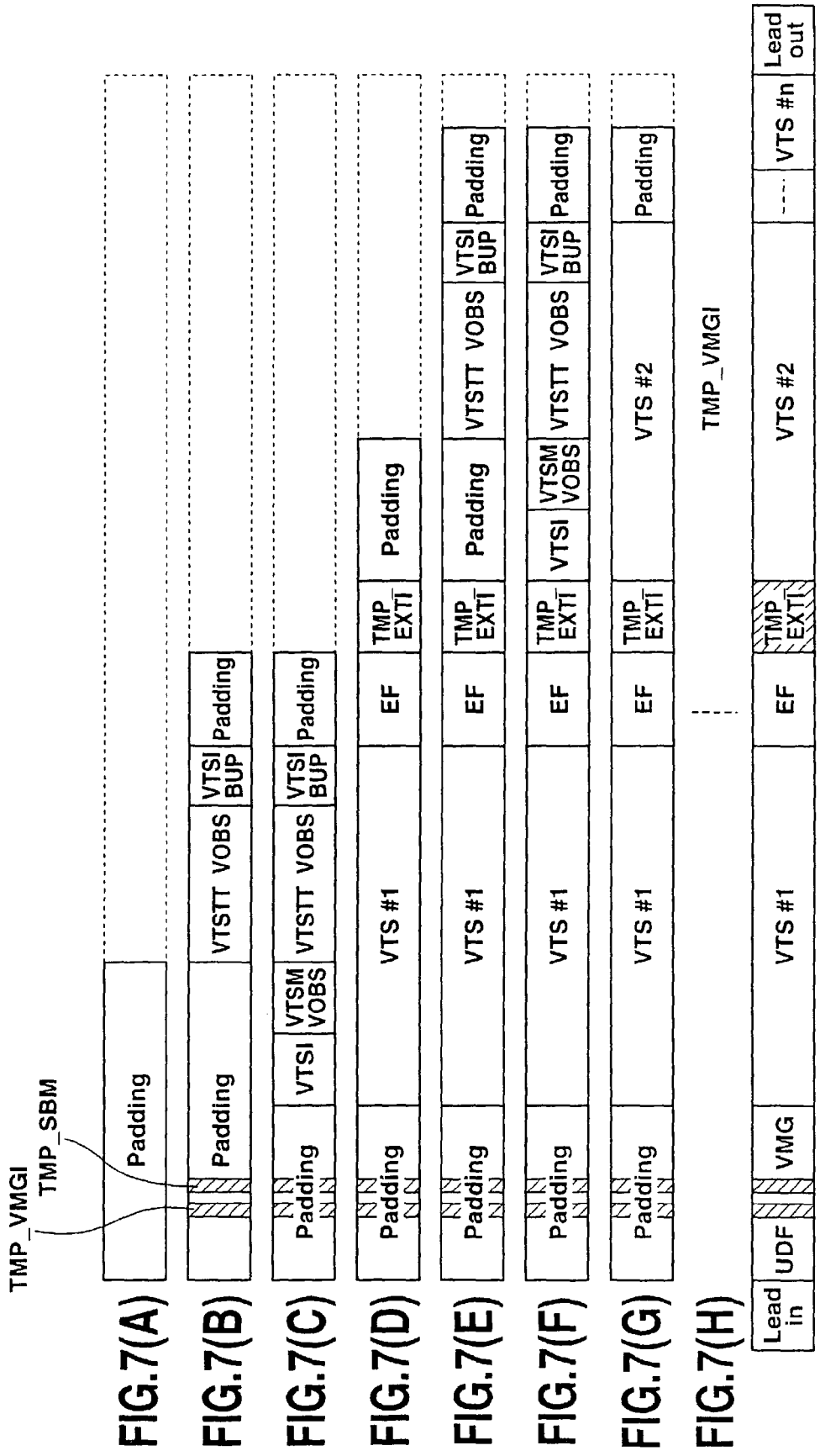
FIG. 7(A) to (H) explain ROW-based recording of moving picture files and still pictures in the optical disk recorder/player shown in FIG. 5.

FIG. 7 is a chart for explanation of the recording of a moving picture file and a still picture file to an optical disk having no files yet recorded therein, namely, a virgin disk, by the ROW method. Updating RMA information acquired from the optical disk 2 and held in the built-in memory, the system controller 10 performs padding to pre-reserve the lead-in zone, UDF, TMP_VMGI area, TMP_SBM area, and recording areas for top titles VTSI and VTSM VOBS in the optical disk 2 in as shown in FIG. 7(A). It should be noted that the "padding" refers to a process for reserving an area by recording there dummy data such as null (zero) or the like.

For recording moving pictures, VTSTT VOBS composed of real data is defined by sequentially recording video data as shown in FIG. 7(B). Upon completion of the real data recording for one title, VTSI BUP is next recorded. For reserving recording areas for subsequent titles VTSI and VTSM VOBS, padding is done. Again at the beginning, TMP_VMGI and $TMP_{13}$ SBM are updated as shown in FIG. 7(C), and VTSI and VTSM VOBS are defined correspondingly to the recording of the real data. Thus, one VTS is recorded to the optical disk.

Also, for continuously recording a next title, real data is recorded next to the area padded with the preceding VTS to define VTSTT VOBS and VTSI BUP, and padding is done for reserving recording areas for next titles VTSI and VTSM VOBS.

Note that "$TMP_{13}$ VMGI" is a provisional VMGI recorded together with VTSI at completion of the recording of one title and includes the number of VTSs recorded in the optical disk, disk name information, physical addresses of VTSs for 99 titles, title name information, etc. The "TMP_VMGI" is updated to latest information for all the titles (VTS) having so far been recorded.

Figure 8:
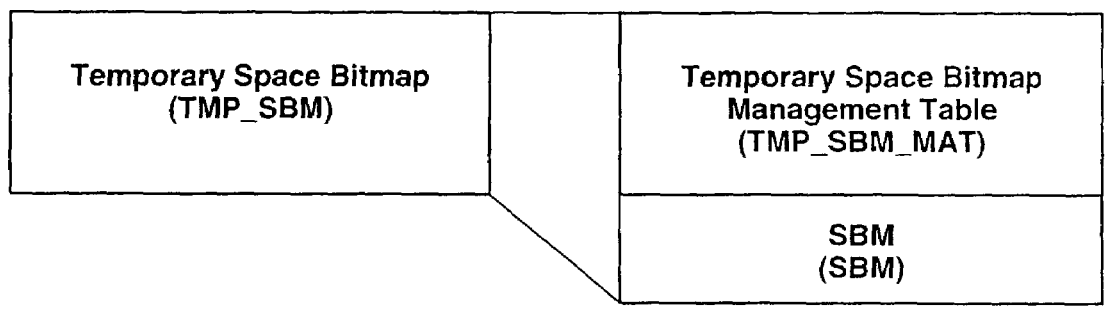
FIG. 8 explains temporary-space management information.

Further, "TMP_SBM" is temporary space bitmap stated to inform recorded areas irrespectively of the existence of any extension file and even when the information structure cannot be understood. It is composed of a temporary space bitmap management table (TMP_SBM_MAT) and space bitmap (SBM) as shown in FIG. 8.

The space bitmap management table (TMP_SBM_MAT) is a table stating bit size of the space bitmap laid after the table TMP_SBM_MAT as shown in Table 1.

TABLE 1

Space Bitmap Management Table

| RBP | Field name | Description | Size |
|---|---|---|---|
| 0 to 11 | TMP_SBM_ID | TMP_SBM identifier | 12 bytes |
| 12 and 13 | TV_VERN | Version number of TMP_VMGI | 2 bytes |
| 14 and 15 | Reserved | Reserved | 2 bytes |
| 16 to 19 | SBM_SZ | Bit counts of SBM | 4 bytes |
| 20 to 23 | Reserved | Reserved | 4 bytes |
| | | Total | 24 bytes |

As shown in Table 1, "TMP_SBM_MAT" is composed of TMP_SBM_ID (RBP 0-11) stating "TMP_SPACEBMP", TV_VERN (RBP 12 and 13) stating the version number of TMP_VMGI, SBM_SZ (RBP 16-19) stating the number of valid bits in an SBM area in which one ECC=1 bit according to ISO/IEC 646: 1983 (a-character) to recognize the TMP_SBM.

Figure 9:
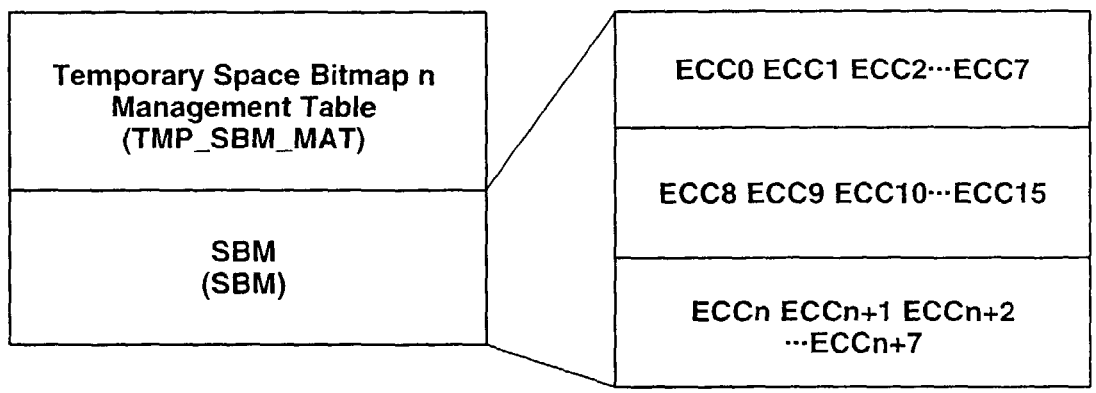
FIG. 9 shows the structure of space bitmap (S BM) forming the temporary-space management information.

Also, the space bitmap (SBM) indicates the availability of the ECC block in bits as shown in FIG. 9. The space bitmap (SBM) is managed starting at the LSN 0 side and indicated with "1" when it is unused. The number of valid bits in the SBM increases as NWA increases. Bits outside the SBM may be 0 or 1.

Thus, the system controller 10 will record titles sequentially. Also, when the optical disk 2 not yet finalized is loaded in the optical disk recorder/player 100 and it is to be rewritten, a similar process is performed starting at the end of a recorded title according to RMA data acquired in step SP2 in FIG. 6 and held in the memory, whereby moving pictures as a result of imaging are additionally written to the optical disk 2.

In the finalization, UDF and VMG are generated according to the management information thus generated and held in the memory to define a lead-in zone and lead-out zone.

Figure 6:
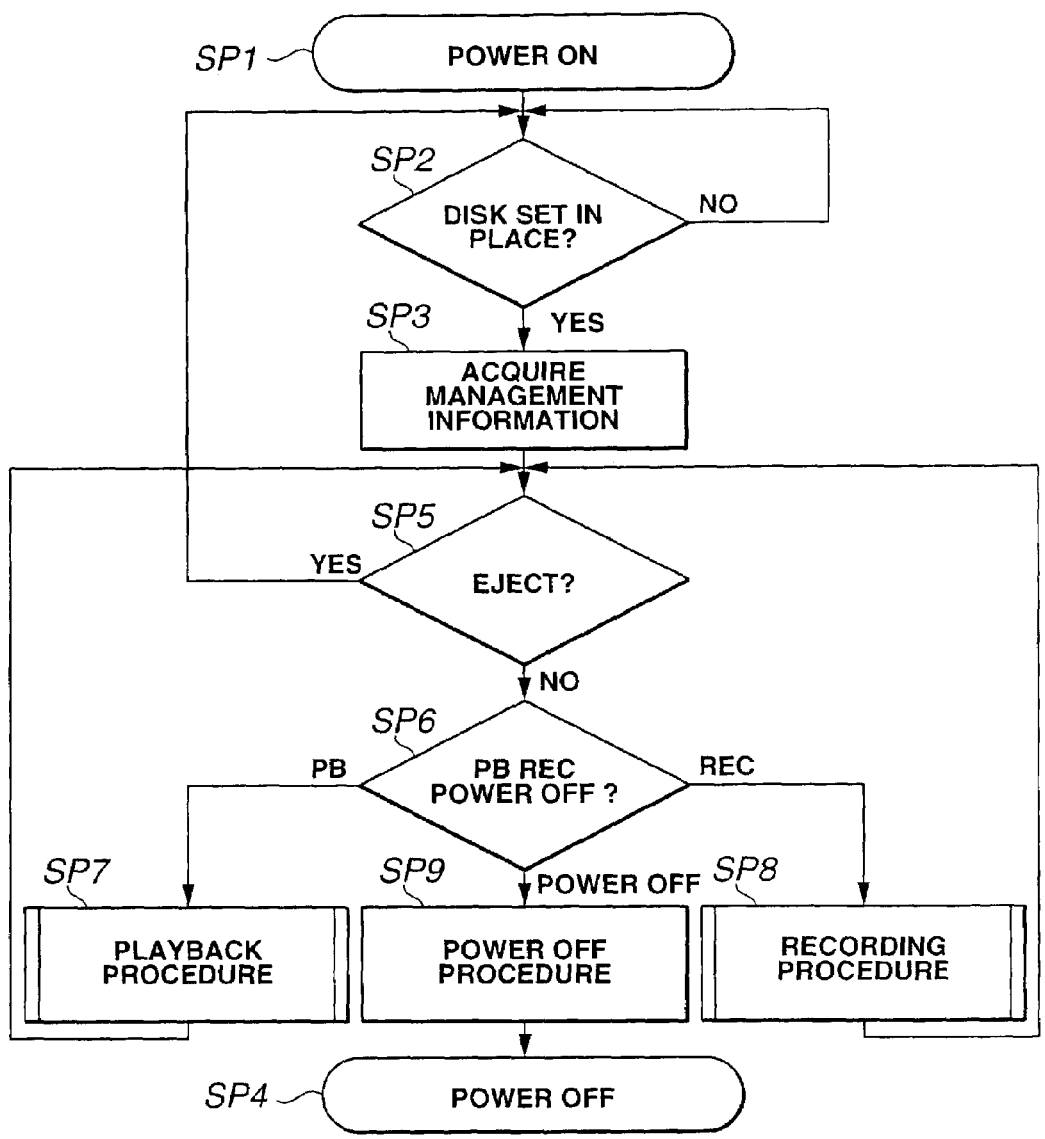
FIG. 6 shows a flow of operations made in the power-on procedure in the optical disk recorder/player shown in FIG. 5.

Note that when data is additionally written to the optical disk 2 not yet finalized, UDF and VMG data are generated for titles already recorded in the optical disk 2 according to VTSI, TMP_VMGI, TMP_SBM and VTSTT VOBS acquired in step SP3 in FIG. 6.

By finalizing the optical disk 2 in which a real-time data recording area is defined by sequentially recording VTSs, UDF and VMG areas are defined in the optical disk 2, and further a lead-in zone and lead-out zone are defined as shown in FIG. 7(H), thereby making the optical disk 2 interchangeable with a read-only optical.

On the other hand, for recording an extension file of still pictures or the like, extension files EF are sequentially recorded starting at the top of an area reserved by padding, intermediate management information TMP_EXTI is recorded and an area for a next title is reserved by padding, as shown in FIG. 7(D). Also, correspondingly to recording of this still picture file EF, intermediate management information TMP_EXTI for management of the still pictures temporarily until finalization of the optical disk is generated sequentially and held in the built-in memory of the system controller 10.

For recording an extension file next, the system controller 10 will repeat such recording of an extension file EF and intermediate management information TMP_EXTI and reservation of an area by padding. On the other hand, for recording a moving picture next, VTSTT VOBS and VTSI BUP are recorded next to the padded area, an area is reserved by padding and VTSI and VTSM VOBS are defined again at the beginning as in recording of a moving picture file after a moving picture file, as shown in FIGS. 7(E) and 7(F). Thus, one VTS is recorded to the optical disk as shown in FIG. 7(G).

Note that the intermediate management information TMP-EXTI is necessary for reading extension files, it is composed of attribute extensions, addresses and sizes of the extension files, date and time when the extension files were recorded to the optical disk 2, and it is collectively recorded for each of the attributes of successively recorded extension files, as shown in FIG. 10. That is, as shown in FIG. 10(B), the intermediate management information is composed of a header, and file management information DJ, DM7 and DM4 for the attributes. For example, in case three JPEG-formatted files FJ1, FJ2 and FJ3 have been recorded under the instruction from the user, then two MPEG-7-formatted files FM71 and FM72 have been recorded and further two MPEG-4-formatted files FM41 and FM42 have been recorded, as shown in FIG. 10(A), the header stated in the intermediate management information indicates that these three types of files are recorded in the optical disk 2 and also the addresses of subsequent file management information DJ, DM7 and DM4. Note that the references "DJ", "DM7" and "DM4" indicate file management information defined in JPEG, MPEG7 and MPEG4, respectively.

Figure 10A:
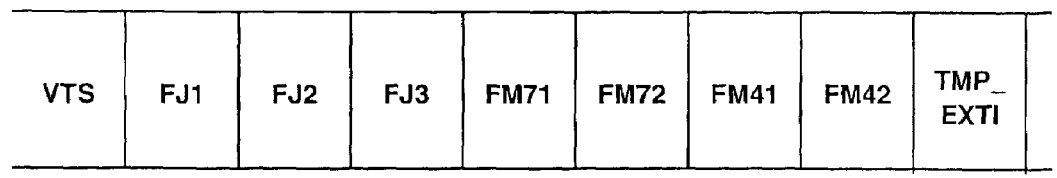
FIG. 10(A) to (D) explain intermediate management information.
Figure 10B:
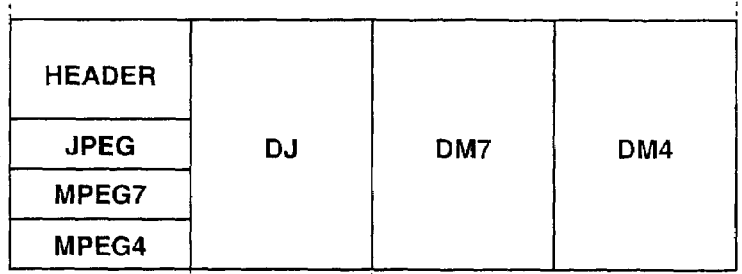
Figure 10C:
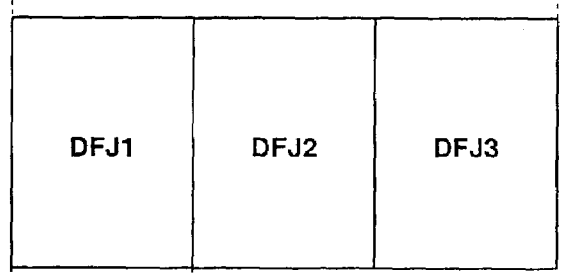
Figure 10D:
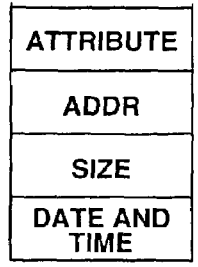

The file management information DJ for each attribute is recorded for each of the management information DFJ1, DFJ2 and DFJ3 in each file as shown in FIG. 10(C), and corresponding extension file attribute, address ADDR, size, data and time of recording, etc. are allocated to the management information DFJI on each file, as shown in FIG. 10(D).

Note that in this embodiment, when the JPEG-based still picture file is applied as an extension file to the optical recorder/player 100, only the file management information as shown in FIG. 10(B) will be generated for each attribute in the optical disk 2 to which data have been recorded by the optical disk recorder/player 100.

Thus, even when any other file than moving picture file is recorded to the optical disk 2, the system controller 10 will record a combination of the file and management information to the user area on the optical disk 2. Also, at this time, when the file going to be recorded to the optical disk 2 is a moving picture tile, he system controller 10 controls so that the management information, file and backup information for the management information will sequentially be recorded. When the file going to be recorded to the optical disk 2 is a still picture file other than a moving picture file, the system controller 10 controls so that the file and management information for the file will be recorded sequentially, whereby the recording format for the management information is converted according to the attribute of the file in consideration.

As above, when the intermediate management information TMP_EXTI is thus recorded, the system controller 10 will store the intermediate management information TMP_EXTI into the built-in memory thereof and hold it there. Also, when the system controller 10 records intermediate management information TMP_EXTI in this way and then records a still picture file again, it will similarly record extension files sequentially and then switch the recording mode of operation from the moving picture recording mode to the still picture recording mode. When it is instructed to start the recording in the still picture mode, the system controller 10 will record the intermediate management information TMP_EXTI to define a padded area, as shown in FIG. 7(D). Then, the system controller 10 will record VTSTT VOBS and VTSI BUP next to the padded area to reserve a next area by padding, as shown in FIG. 7(E), and define VTSI and VTSM VOBS again at the beginning, as shown in FIG. 7(F). Thus, the system controller 10 will record one VTS next to the intermediate management information TMP_EXTI in the optical disk, as shown in FIG. 7(G).

With the above operations, the optical disk recorder/player 100 records a combination of a still picture file not in the DVD video format and the management information for the still picture file along with a moving picture file in the DVD video format. Thus, in the conventional optical disk drive which supports only the DVD video format, when the thus recorded optical disk 2 is searched for a real-time data recording area according to RMA, only VTSI and VTSTT VOBS, being VTS management information, are detected, and an extension file of still pictures, not defined in any way, and intermediate management information for the extension file will not be recognized as any significant file. On the other hand, in an optical disk drive which supports the above type of extension file, the VTS management information as well as an extension file of still pictures and intermediate management information for the extension file will be recognized.

Thus, the system controller 10 will record extension files without influence on the reproduction of moving pictures in the conventional optical disc drive.

Thus, when instructed from the user to finalize the optical disk 2 having the extension files recorded therein as above, the system controller 10 will generate UDF data from the management information (VTSI and VTSTT VOBS) for all the titles having thus been generated with reference to the management table and intermediate management information for all the extension files, and record the UDF data to the optical disk 2, as shown in FIG. 7(H). Also, the system controller 10 will generate VMG data from only the management information (VTSI and VTSTT VOBS) for all the titles, and record it to the optical disk 2. It is important to note that the UDF and VMG data are generated according to the intermediate management information held in the memory or the like. Also, having recorded the UDF and VMG in this way, the system controller 10 will define lead-in and lead-out zones. It should also be noted that the system controller 10 will record the UDF and VMG data, define the lead-in and lead-out zones and record the intermediate management information, all by outputting the corresponding data to the DVD signal processor 14.

Figure 11:
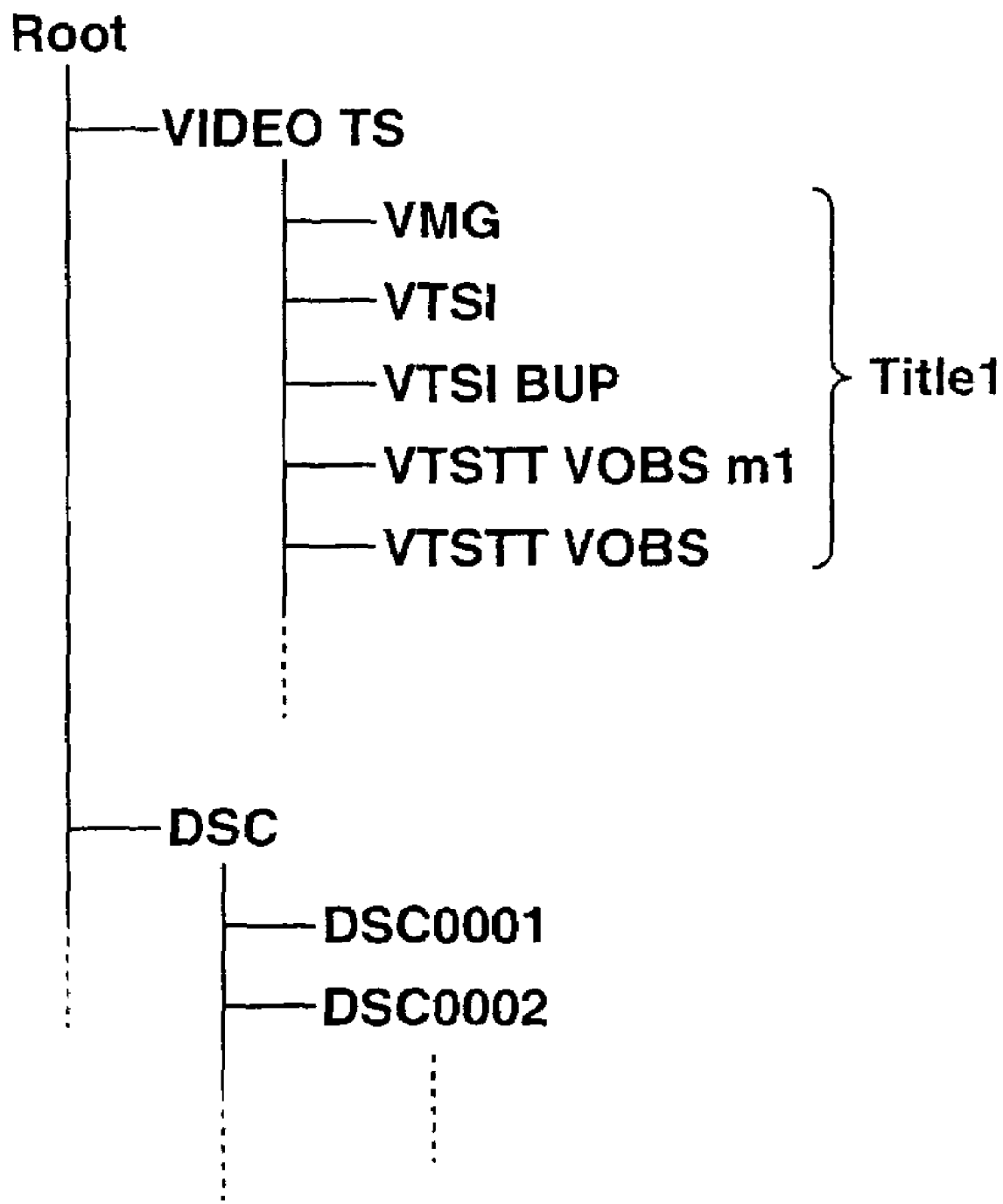
FIG. 11 explains the directory structure in the optical disk.

Therefore, in this embodiment, the UDF data for management of the computer will include management information by which also an extension file can be recognized and accessed but the VMG data for management of DVD reproduction will include no extension file-related information. As shown in FIG. 11, the system controller 10 will reproduce the UDF data for management of the computer to generate UDF in a separate folder in the same hierarchical layer as a DVD title so that only extension files will be displayed. For the intermediate management information having been described above with reference to FIG. 10, the system controller 10 will generate UDF with no file name, address information such as an address, etc. being stated. It should be noted that the system controller 10 will of course generate the UDF so that each extension file can be accessed similarly to titles VTSI, VTSM VOBS, etc. Thus, in this embodiment, when the optical disk 2 is reproduced by a computer, a file of provisional intermediate management information which is meaningless in reproduction of the optical disk 2 by the computer is made invisible from the user so that the optical disk recorder/player 100 can accordingly be improved in operability.

Thus, the conventional optical disk drive for DVD can only read moving picture files recorded in the optical disk 2 by recording VMG data to the optical disk 2. On the contrary, in the optical disk recorder/player 100, the system controller 10 acquires UDF and VMG data in step SP3 in FIG. 6 to control the operation of the entire apparatus for access to each of extension files based on the UDF data, to thereby reproduce the extension files as well. It should be noted that in FIG. 11, "Root" is a root directory, "VIDEO TS" is a moving picture folder and "DSC" is an extension file folder. Also, "DSC0001" and "DSC0002" are extension files, respectively.

Thus, the optical disk recorder/player 100 can record a moving picture file in the DVD video format and also a combination of a still picture file and intermediate management information for the file not in the DVD video format, with no influence on the reproduction of the moving picture file in the conventional optical disc drive.

Note that to record the extension files as above, the system controller 10 will record and hold management information for each of the extension files in its built-in memory.

On the other hand, for finalizing the optical disk 2, the system controller 10 will generate UDF and VMG data, record these UDF and VMG data in an area reserved by padding to generate UDF and VMG and define a lead-in zone and lead-out zone. Thus, the management information can be recorded so that moving and still picture files can be read by some computers from optical disks which support extension files, and only moving pictures can be read by some conventional DVD-oriented optical disk drives.

Figure 12:
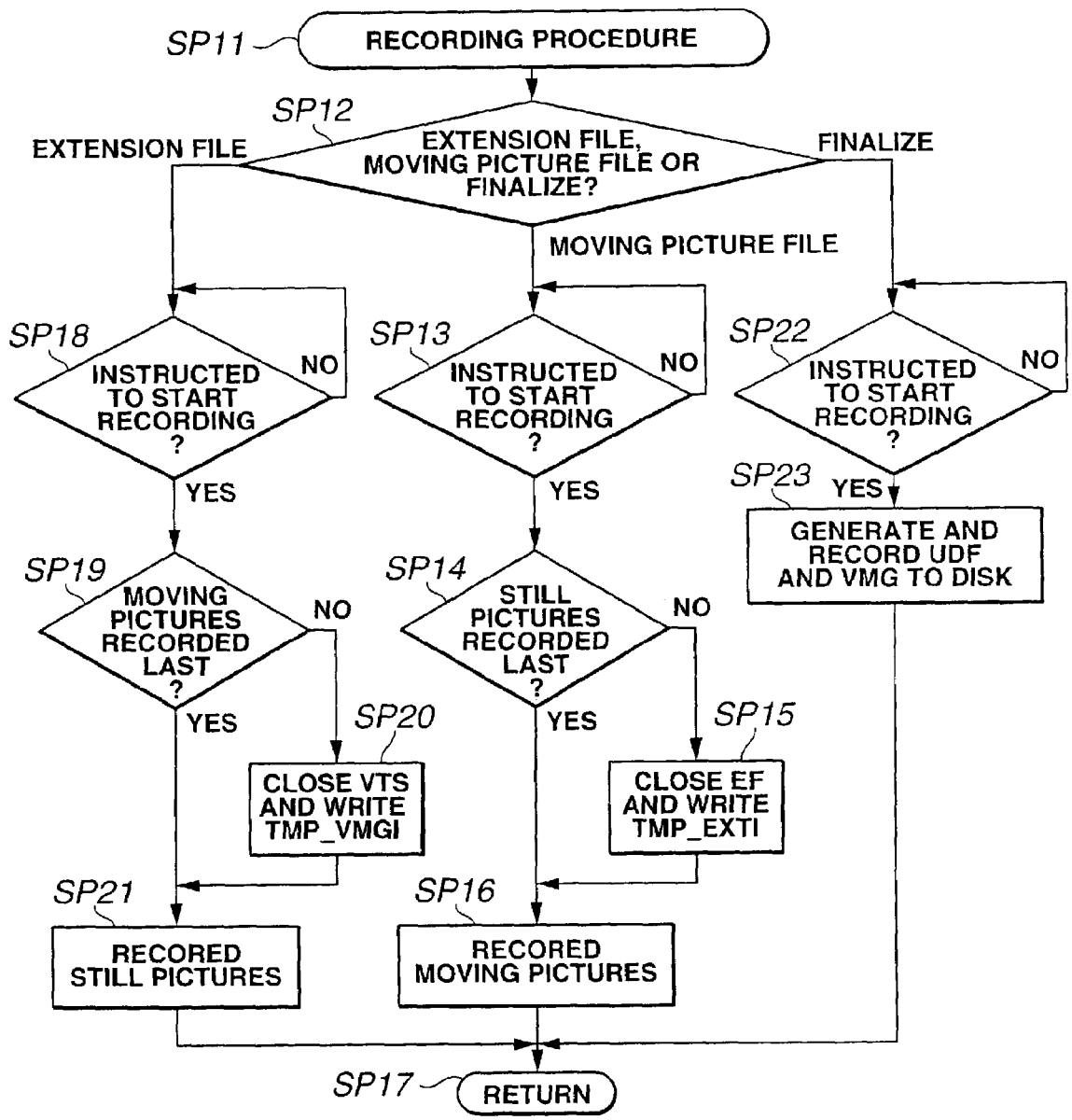
FIG. 12 shows a flow of operations made in the recording procedure in the optical disk recorder/player shown in FIG. 5.

FIG. 12 shows a flow of operations in the recording procedure having been described above with reference to FIG. 7. When this recording procedure is started, the system controller 10 goes from step SP11 to SP12 where it will judge which the user has instructed to do, recording of a moving picture file, recording of a still picture file or finalization.

When the user instruction is to record a moving picture file, the system controller 10 goes from step SP12 to SP13 where it will judge whether the user has instructed to start the recording. If the result of judgment in step SP13 is negative, the system controller 10 will repeat the operation in step SP13. If the above result of judgment is affirmative, the system controller 10 goes from step SP13 to SP14 where it will record real data as having been described above with reference to FIG. 7. Further, the system controller 10 goes to step SP15 where it will judge whether the user has instructed to stop the recording. If the result of judgment in step SP15 is negative, the system controller 10 will go back to step SP14. This, the system controller 10 repeats the operations in steps SP14, SP15 and again in SP14, thereby sequentially recording real data. When the above result of judgment is affirmative, the system controller 10 will complete the recording of VTSTT VOBS data with exiting the recording of real data.

Next, the system controller 10 goes to step SP16 where it will sequentially define VTSI BUP, VTSI and VTSM VOBS areas in the optical disk 2, thereby recording one VTS, and then goes to step SP17 where it will exit this recording procedure.

On the other hand, when the user's instruction is to record a still picture file, the system controller 10 goes from step SP12 to SP18 where it will judge whether the user has instructed to start the recording. If the result of judgment in step SP18 is negative, the system controller 10 will repeat the operation in step SP18. On the contrary, when the above result of judgment is affirmative, the system controller 10 goes from step SP18 to SP19 where it will record an extension file for the still picture file as having been described above with reference to FIG. 7. Further, the system controller 10 goes to step SP20 where it will judge whether the user has instructed to stop the recording. If the result of judgment in step SP20 is negative, the system controller 10 will go back to step SP19. Thus, the system controller 10 repeats the operations in steps SP19, SP20 and again in SP19 to sequentially record the still picture files. If the above result of judgement is affirmative, the system controller 10 terminates the recording of still picture files and goes to step SP21 where it will record intermediate management information, and goes to step SP17 where it will exit this recording procedure.

When the user's instruction is to record data related to finalization of the optical disk 2, the system controller 10 goes from step SP12 to SP22 where it will judge whether the user has instructed to start the recording. If the result of judgment in step SP22 is negative, the system controller 10 will repeat the operation in step SP22. When the above result of judgment is affirmative, the system controller 10 goes from step SP22 to SP23 where it will finalize the optical disk 2 as having been described above with reference to FIG. 7, and then goes to step SP17 where it will exit this procedure.

Figure 13:
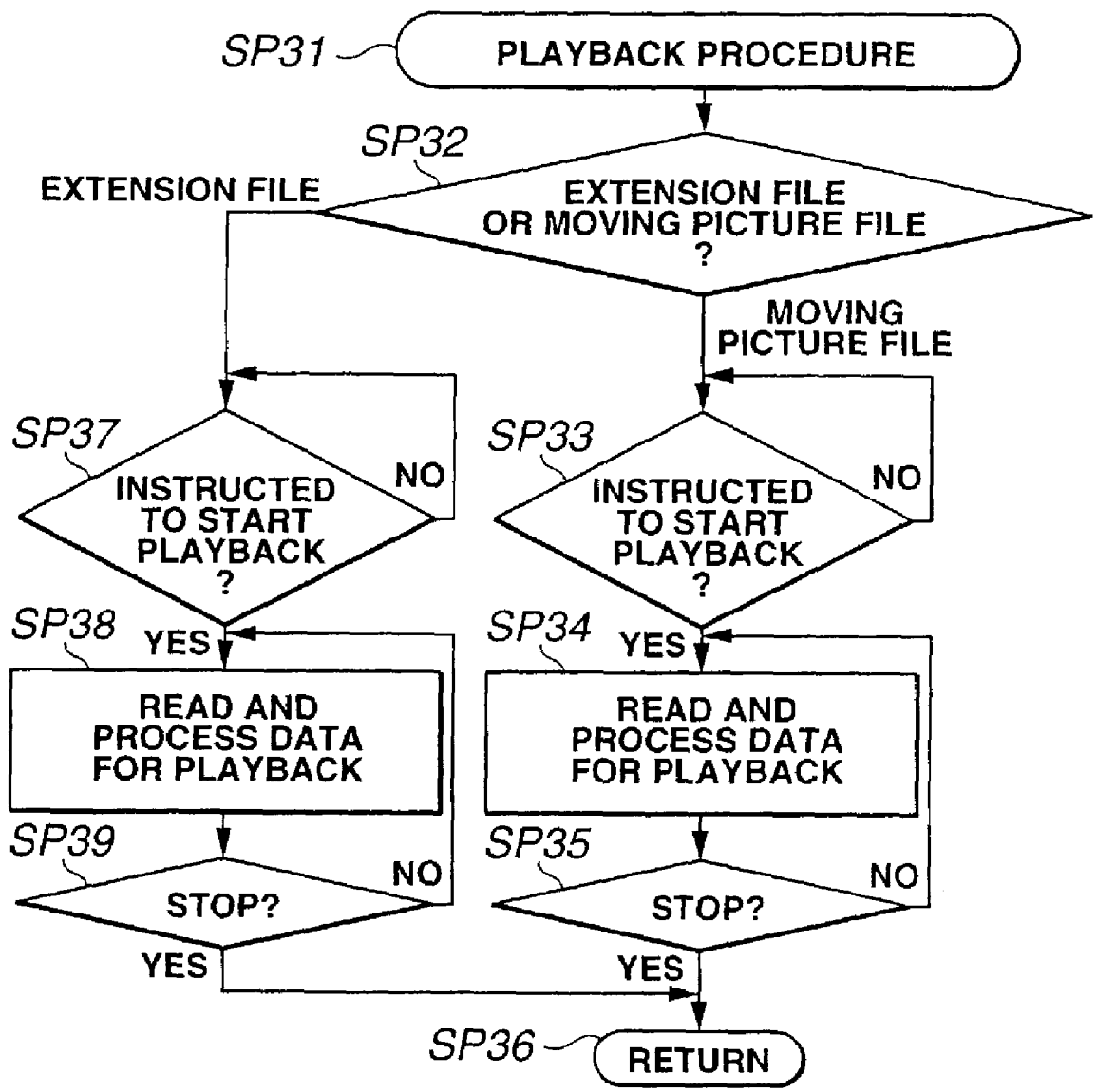
FIG. 13 shows a flow of operations made in the reproducing procedure in the optical disk recorder/player shown in FIG. 5.

FIG. 13 shows a flow of operations included in the reproducing procedure shown in FIG. 7. When this reproducing procedure is started, the system controller 10 goes from step SP31 to SP32 where it will judge which the user has instructed to read, a moving picture file or a still picture file.

When the user's instruction is for reproduction of a moving picture file, the system controller 10 goes from step SP32 to SP33 where it will judge whether the user has instructed to start the reproduction. If the result of judgment is negative, the system controller 10 will repeat the operation in step SP33. When the above result of judgment is affirmative, the system controller 10 goes from step SP33 to SP 34 where it will control the entire apparatus to reproduce a moving picture file designated by the user with reference to the management information held in the memory.

That is, when the optical disk 2 is a finalized one, the system controller 10 will detect the address of a file in consideration on the basis of the VMG data held in the built-in memory thereof, and instruct each of the components of the optical disk recorder/player 100 to read the file from the address. On the other hand, in case the optical disk 2 is not any finalized one, the system controller 10 will detect the address of the file in consideration on the basis of titles VTSI and VTSTT VOBS held in the memory and record of corresponding, and instruct each of the components of the optical disk recorder/player 100 to read the file from the address.

After instructing the reproduction as above, the system controller 10 goes to step SP35 where it will judge whether the user has instructed to stop the reproduction. If the result of judgment in step SP35 is negative, the system controller 10 will return to step SP34. Thus, the system controller 10 repeats the operations in steps SP34, SP35 and again in SP34 to sequentially read moving picture files designed by the user. On the other hand, when the above result of judgment is affirmative, the system controller 10 will terminate the reproducing operation, and goes to step SP36 where it will exit the reproducing procedure.

On the other hand, in case the user's instruction is to read an extension file, the system controller 10 goes from step SP32 to SP37 where it will judge whether the user has instructed to start the reproduction. If the result of judgment is negative, the system controller 10 will repeat the operation in step SP37. On the contrary, when the result of judgement is affirmative, the system controller 10 goes from step SP37 to SP38.

In case the optical disk 2 is a finalized one, the system controller 10 will detect the address of a file in consideration on the basis of the UDF data held in the memory thereof, and instruct each of the components of the optical disk recorder/player 100 to read the file from the address. On the other hand, in case the optical disk 2 is not any finalized one, the system controller 10 will detect the address of the file in consideration on the basis of the intermediate management information held in the memory, and instruct each of the components of the optical disk recorder/player 100 to read the file from the address.

After instructing the reproduction as above, the system controller 10 goes to step SP39 where it will judge whether the user has instructed to stop the reproduction. If the result of judgment in step SP 39 is negative, the system controller 10 will go back to step SP38. Thus, the system controller 10 repeats the operations in steps SP38, SP39 and again in SP38 to sequentially read still picture files designated by the user. On the contrary, if the above result of judgment is affirmative, the system controller 10 terminates the reproducing operation, and goes to step SP36 where it will exit the reproducing procedure.

Thus, in this embodiment, the system controller 10 provides a management information generating means for generating management information for a file to be recorded, and the DVD signal processor 14, random access memory 15, analog front end block 16, motor drive controller 18, optical head 19 and spindle motor 20 form together a recording means for recording the file in combination with the management information for the file to the user area on the optical disk 2. Also, the system controller 10 provides a control means for controlling the operations of the management information generating means and recording means, and it forms together with the compress/expand block 6, header information processor 7, DVD signal processor 14, random access memory 15, analog front end block 16, motor drive controller 18, optical head 19 and spindle motor 20, a reproducing means for reading a file of each attribute recorded in the optical disk on the basis of the management information recorded in the optical disk 2 in combination with the file.

The optical disk recorder/player 100 constructed as having been described above with reference to FIG. 5 functions as will be described herebelow:

When the optical disk 2 is loaded by the user into the optical disk recorder/player 100 turned on or when the optical disk recorder/player 100 is turned on with the optical disk 1 loaded in the optical disk recorder/player 100, the system controller 10 controls the DVD signal processor 14 and motor drive controller 18 to drive the sled motor 21 in order to move the optical head 19 toward the inner circumference of the optical disk 2. Further, a laser beam is projected from the optical head 19 to the optical disk 2. A return light is detected by the optical head 19 and is sequentially processed through the analog front end block 16 and system controller 10. The optical head 19 undergoes tracking control and focus control by the system controller 10 via the DVD signal processor 14 and motor drive controller 18. Also, the detected return light is processed by the DVD signal processor 14 to read data from the optical disk 2. In the optical disk recorder/player 100, various kinds of information recorded along the inner circumference of the optical disk 2 are acquired by the system controller 10 through the above series of operations and held in the memory built in the system controller 10.

In case the optical disk 2 is a read-only optical disk formed by stamping or in case it is a finalized one having only moving picture files recorded therein, the system controller 10 will acquire VMG data recorded along the inner circumference of the optical disk 2 and which is management information for a DVD player through the above series of operations. Thus in the optical disk recorder/player 100, when it is instructed by the user to reproduce the optical disk 2, the spindle motor 20 is driven according to the VMG data by means of the DVD signal processor 14 and motor drive controller 18 to move the optical head 19 to the address of a user-designated title (seek operation), and with the optical head 19 undergoing the tracking control and focus control on the basis of the detected return light, the detected return light is sequentially processed through the DVD signal processor 14, header information processor 7 and compress/expand block 6 to read video data composed of moving pictures. More particularly, a read signal being a result of return light detection and which varies in level correspondingly to pit trains on the optical disk 2 is processed by the analog front end block 16 to produce read data, and the read data is decoded, deinterleaved and error-corrected by the DVD signal processor 14. Also, the error-corrected read data is supplied to the header information processor 7 where the header is removed from the data and the system controller 10 is informed of the header. Further, the read signal is supplied to the compress/expand block 6 and broken by the multiplexer 63 into video and audio data. The video data is released by the video processor 61 from the MPEG-compressed state and displayed on the monitor 12 or supplied to an external apparatus via the video/audio encoder 13. On the other hand, the audio data is expanded by the audio processor 62 and then supplied to the monitor 12 for monitoring or supplied to the external apparatus via the video/audio encoder 13.

In case the optical disk 2 is a recordable virgin disk, however, when the optical disk 2 is loaded into the optical disk recorder/player 100 or when the optical disk recorder/player 100 is turned on, the system controller 10 will access the optical disk 2 to acquire RMA data from the latter. In the optical disk recorder/player 100, when the user selects the moving picture capture mode and in case the optical disk 2 is DVD-RW, the system controller 10 will update the RMA data held in the memory thereof and define areas for UDF and VMG and also areas for VTSI and VTSM VOBS of a first VTS.

When the user instructs to start the recording in this condition, video and audio data are sequentially supplied from the video input block 3 and audio input block 5 and the video data is compressed by the video processor 61 with the MPEG technique while the audio data is compressed by the audio processor 62. Further, the video and audio data thus compressed are multiplexed by the multiplexer 63 and then the multiplexed data has a header added thereto by the header information processor 7. In the DVD signal processor 14 provided downstream, the multiplexed data has an error correction code added thereto, and undergoes interleaving and encoding. According to the result of this data processing, the analog front end block 16 will set an amount of laser beam emitted from the optical head 19 to the optical disk 2. Thus, pits are sequentially formed on the optical disk 2 to sequentially record moving video data composed of moving pictures.

In the optical disk recorder/player 100, when the user instructs to stop the recording, a series of operations in the compress/expand block 6 and the like is stopped by the system controller 10 to cease the recording of the video data and then the management information for the moving picture file thus recorded is recorded to the optical disk 2. Namely, in the optical disk recorder/player 100, the system controller 10 will generate management information from the address, file size, recording date and time, etc. of the moving picture data, and supply the management information to the DVD signal processor 14 and record it to the optical disk 2 so that the management information will be recorded next to the video data, whereby VTSI BUP area is defined. When the optical disk 2 is a DVD-RW or the like, areas for VTSI and VTSM VOBS of a next VTS are reserved by padding, the optical head 19 is caused to seek for the previously reserved VTSI and VTSM VOBS areas. Similar management information is supplied to the DVD signal processor 14 and recorded to the optical disk 2 to define the intended VTSI and VTSM VOBS areas.

In the optical disk recorder/player 100, video data composed of moving pictures is recorded for one title. Thus, in the optical disk recorder/player 100, for recording a moving picture file, management information and the file are recorded in the DVD video format in which management information composed of VTSI, management information composed of VTSM VOBS, moving picture file and management information composed of VTSI BUP are laid successively.

When the user then instructs to record moving pictures, the optical disc recorder/player 100 repeats the similar operations to sequentially record titles to the optical disk 2. In case an optical disk having such titles sequentially recorded therein as above and not yet finalized is loaded into the optical disk recorder/player 100, the management information having been recorded in combination with the titles are initially acquired along with RMA data by scanning the optical disk 2 with reference to the RMA data, and are held in the memory built in the system controller 10. A title continuous from the end of a title detected through scanning of the optical disc 2 is recorded.

In the optical disk recorder/player 100, when titles are recorded to the optical disk 2 as above and the user instructs to finalize the optical disk 2, UDF and VMG data are generated according to the management information recorded in combination with the titles recorded in the memory of the system controller 10 and recorded to the inner-circumferential area reserved on the optical disk 2, and also the lead-in and lead-out zones are defined. Thus, this optical disk can be set up for reproduction by a DVD player which supports only the ordinary DVD format. On the other hand, in case the user has selected the still picture recording mode, UDF and VMG areas will be reserved in a virgin disk by updating RMA held in the memory and also by padding as in the recording of moving pictures. Also, in the optical disk drive, the mode of operation of the imaging means is switched to the still picture mode and the operation mode of the compress/expand block 6 is switched to the operation mode for a JPEG-based data compression.

When the user instructs to start the recording of still pictures in this condition, video data composed of still pictures supplied from the video input block 3 are compressed by the video processor 61 of the compress/expand block 6 into the JPEG format, and then multiplexed by the multiplexer 63 with audio data supplied from the audio processor 62. Thus, in the optical disk recorder/player 100, the still pictures-composed video data, not any moving pictures-composed video data, are provided for recording and sequentially recorded to the optical disk 2 as in the recording of the moving pictures.

In this optical disk recorder/player 100, for recording moving pictures, areas for VTSI and VTSM VOBS are initially reserved for recording real data, but for recording still pictures, real data composed of the still pictures are recorded without reservation of such areas. Also, when the user instructs to record still pictures, subsequent still pictures are recorded to the optical disk 2 as above. At each recording, the address of each file is recorded to the memory of the system controller 10.

In the optical disk recorder/player 100, when the recording of still pictures is stopped by the user changing the mode of operation or otherwise with a desired number of still picture files having been recorded to the optical disk, the management information composed of addresses etc. held in the memory is recorded, as provisional intermediate management information intended for use until the finalization, in successive areas for the plurality of still picture files. Thus in the optical disk recorder/player 100, for recording other files than any moving picture file, the files and management information for them will be recorded in the order of a file and management information, and a format is selected for recording the files and management information depending upon the attribute of the files to be recorded.

As above, the optical disk recorder/player 100 can also record still picture files not defined in the DVD video format to the optical disk 2. Also, when the optical disk 2 having the still picture files thus recorded therein is loaded into an optical disk drive which supports only the DVD video format, the management information having been recorded according to the DVD video format such as VTSI or the like is detected through a search made at the time of disk loading, and VTS is read based on the management information. Thus, the still picture files thus recorded and management information for the files will not possibly influence the reading of any moving pictures. Therefore, any ordinary DVD player can read a moving picture file from the optical disk having the moving picture file thus recorded therein.

On the contrary, an optical disk drive which also supports other than the moving picture files can read still picture files as well. That is, in the optical disk recorder/player 100 having the aforementioned optical disk 2 loaded therein, the optical disk 2 will initially be searched with reference to the management table to read VTS and VTSM VOBS data as well as the intermediate management information for the still picture files from the optical disk 2, and the management information be also held in the memory of the system controller 10.

Thus, the moving and still picture titles recorded in the optical disk 2 under the user's instruction can be provided to the user. Also, when the user instructs to read moving pictures, the optical disk recorder/player 100 can read the moving picture files on the basis of the VTS and VTSM VOBS data as having been described concerning the read-only optical disk.

On the other hand, when the user instructs to read a still picture file, the address etc. of the file will be detected on the basis of the intermediate management information held in the memory of the system controller 10, data recorded in the optical disk 2 be sequentially read according to the result of detection, and processed through the operations similar to those in reading the moving pictures. In the optical disk recorder/player 100, to process the read data including the still pictures in processing of the read data, the operation of the video processor 61 is changed by the system controller 10 to expand the video data having been compressed according to the JPEG, and video data including the still pictures is monitored on the monitor 12 and further can be supplied from the video/audio encoder 13 to an external apparatus.

Generally, the still picture file is smaller in size than the moving picture file. In the optical disk recorder/player 100, however, intermediate management information as such management information is generated and recorded for a plurality of files. Thus in the optical disk recorder/player 100, since an extension file composed of such still picture files or the like is recorded, it is possible to minimize the reduction of recording areas due to the recording of management files.

Also, the intermediate management information for a plurality of files is collectively recorded for each file type being the attribute of a file, whereby the operations for search and finalization (which will be described in detail later) can be simplified.

With the above operations, the optical disk recorder/player 100 is operated by the user to sequentially record moving and still picture files to a so-called virgin disk, an optical disk having only moving pictures recorded therein but not yet finalized and an optical disk having moving and still picture files recorded therein but not yet finalized.

On the other hand, when the user instructs to finalize any of the above optical disks having moving and still pictures recorded therein as above, UDF data for a computer is generated based on the management information and intermediate management information, acquired from the optical disk and held in the memory of the system controller 10, as well as on the management information and intermediate management information generated by recording moving and still pictures and held in the memory, and the UDF data is recorded to a pre-reserved area on the optical disk 2. Also, VMG data for a DVD player is generated according to only the management information for the moving picture file, and similarly recorded to the optical disk 2.

Thus in the optical disk recorder/player 100, management information for all files recorded on the optical disk 2 will be recorded collectively in combination with the files to the UDF area for recording the first management information, of the management information recording area on the optical disk 2, while management information for only a moving picture file having a specific attribute, recorded in the optical disk 2, will be recorded in combination with the moving picture file to the VMG area intended for a DVD to record the second management information.

Thus, when the optical disk 2 finalized as above is reproduced by a DVD player, files recorded in the optical disk 2 will be read with reference to the DVD-oriented VMG area, whereby it is possible to positively read the DVD video-formatted moving pictures without being influenced by recording of the files such as still picture files.

When reproducing such a finalized optical disk by a computer, since the UDF is defined in a file management format corresponding to the file management system of the computer and the computer will read each file based on the UDF, it is possible to read the moving picture file as well as the still picture file.

In a ROW-based DVD-RW played in the optical disc recorder/player 100 according to the present invention, a DVD video file is managed according to provisional VMGI (TMP_VMGI) and an extension file other than the DVD video file, such as a JPEG file of the like is managed according to intermediate management information (TMP_EXTI) as shown in FIG. 4(A), and temporary space bitmap (TMP$_{13}$ SBM) used in UDF and the like is added to provisional VMGI (TMP_VMGI) as shown in FIG. 4(B) to record a combination of the DVD video file and extension file such as JPEG file and manage the temporary space. Thereby, the temporary space can be known from TMP_SBM, and even when the extension file has been deleted, the DVD-RW is made interchangeable with a read-only optical disk through finalization, as shown in FIG. 4(C).

Also, by selecting a format for management information to be recorded in combination with a file depending upon the attribute of the file, a file of still pictures other than moving pictures can also be recorded.

That is, a moving picture file is recorded in a sequence of management information the file, backup information for the management information with the DVD video format being applied to the file and management information. On the other hand, any file other than a moving picture file is recorded in the order of the file and management information, and thus a file not defined in the DVD video format can be recorded without any influence on the reading of the moving picture file.

Also, by reading files of different attributes from the optical disk on the basis of the management information for other than the moving picture files recorded as above, any other file than a moving picture file can also be read for utilization.

Also, by collectively recording, under the user's instruction, management information in combination with all files recorded in the optical disk to the first management information recording area and management information in combination with only files having a specific attribute to the second management information recording area, it is possible to read the moving picture file by some ordinary DVD players and all the files of moving and still pictures by some computers.

Also, it should be noted that, besides the optical disk, the present invention can be applied to other recording medium such as a magnetic disk, magnetic tape or the like.

As having been described in the foregoing, the present invention permits to easily know a position where a VTS or a file is to be written by holding one temporary space bitmap without dependence on any application, and also to manage a temporary space from which a VTS or file has been deleted and pad the temporary area.

What is claimed is:

1. A recording method of recording a combination of a file to be recorded and management information for the file to a user area on a recording medium, the method comprising the steps of:

changing the format of recording the combination of the file and management information to the user area on the recording medium according to the attribute of the file;

managing a main file according to provisional management information;

managing an extension file other than the main file according to intermediate management information; and managing a temporary space to which the main and extension files are to be recorded, according to the intermediate management information, thereby recording the main and extension files together to the recording medium.

2. The method as set forth in claim 1, wherein when the file is a file of moving pictures, the recording format for the file and management information is the DVD video format, the recording medium is a DVD-RW (DVD-recordable), the file is VTS (video title set) in the DVD video format and the management information is VMGI (video manager information) in the DVD video format, a DVD video file is managed according to provisional VMGI (TMP_VMGI), an extension file other than the DVD video file is managed according to intermediate management information (TMP_EXTI), and an area to which the DVD video file and extension file are to be recorded is managed according to temporary space bitmap (TMP_SBM), thereby recording the DVD video file and extension file by the ROW (restricted overwrite) system.

3. A recording apparatus comprising:

a management information generating means for generating management information for a file to be recorded;

a recording means for recording the file and management information for the file in combination to a user area on a recording medium; and a control means for changing the operations of at least the management information generating means and recording means;

the control means changing the format of recording the combination of the file and management information to the user area on the recording medium according to the attribute of the file, managing a main file according to provisional management information, managing an extension file other than the main file according to intermediate management information, and managing a temporary space to which the main and extension files are to be recorded, according to the intermediate management information, thereby recording the main file and extension files together to the recording medium.

4. The apparatus as set forth in claim 3, wherein when the file is a file of moving pictures, the recording format for the file and management information is the DVD video format, the recording medium is a DVD-RW (DVD-recordable), the file is VTS (video title set) in the DVD video format and the management information is VMGI (video manager information) in the DVD video format; and the control means manages a DVD video file according to provisional VMGI (TMP_VMGI), an extension file other than the DVD video file according to intermediate management information (TMP_EXTI), and an area to which the DVD video file and extension file are to be recorded, according to temporary space bitmap (TMP_SBM), thereby recording the DVD video file and extension file by the ROW (restricted overwrite) system.

5. A computer readable medium encoded with instructions capable of being executed by a computer provided in a recording apparatus records a combination of a file to be recorded and management information for the file to a user area on a recording medium, the program causing the control computer to function as a control means to:

change the format of recording the combination of the file and management information to the user area on the recording medium according to the attribute of the file;

manage a main file according to provisional management information;

manage an extension file other than the main file according to intermediate management information; and manage a temporary space to which the main and extension files are to be recorded, according to the intermediate management information, thereby recording the main and extension files together to the recording medium.

* * * * *